United States Patent
Gardes et al.

(10) Patent No.: US 8,001,570 B2
(45) Date of Patent: Aug. 16, 2011

(54) TRANSPARENT ACCESS OF STB MHP DIGITAL TV MIDDLEWARE TO IP VIDEO CONTENT

(75) Inventors: Laurent Gardes, Boulogne Billiancourt (FR); Jean-Benoit Pina, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 1624 days.

(21) Appl. No.: 10/499,940

(22) PCT Filed: Dec. 16, 2002

(86) PCT No.: PCT/IB02/05495
§ 371 (c)(1),
(2), (4) Date: Jun. 23, 2004

(87) PCT Pub. No.: WO03/056828
PCT Pub. Date: Jul. 10, 2003

(65) Prior Publication Data
US 2005/0055728 A1    Mar. 10, 2005

(30) Foreign Application Priority Data
Dec. 28, 2001    (EP) ..................... 01403385

(51) Int. Cl.
*H04N 5/445* (2011.01)
*H04N 7/173* (2011.01)
(52) U.S. Cl. ............. 725/51; 725/49; 725/109; 709/217
(58) Field of Classification Search .......... 725/109–134, 725/37–61; 709/217–231
See application file for complete search history.

(56) References Cited

U.S. PATENT DOCUMENTS

| | | | |
|---|---|---|---|
| 6,574,272 B1 * | 6/2003 | Peace | 375/222 |
| 6,763,035 B1 * | 7/2004 | Koskelainen et al. | 370/466 |
| 6,973,050 B2 * | 12/2005 | Birdwell et al. | 370/270 |
| 6,993,782 B1 * | 1/2006 | Newberry et al. | 725/39 |
| 7,103,311 B2 * | 9/2006 | Aaltonen et al. | 455/3.04 |
| 7,177,841 B2 * | 2/2007 | Inoue et al. | 705/51 |
| 7,340,048 B2 * | 3/2008 | Stern et al. | 379/218.01 |
| 7,558,211 B2 * | 7/2009 | Cahn | 370/241 |
| 2001/0047517 A1 * | 11/2001 | Christopoulos et al. | 725/87 |
| 2002/0184642 A1 * | 12/2002 | Lude et al. | 725/105 |
| 2002/0186683 A1 * | 12/2002 | Buck et al. | 370/352 |
| 2005/0166224 A1 * | 7/2005 | Ficco | 725/35 |

FOREIGN PATENT DOCUMENTS
JP    11110401 A    4/1999

OTHER PUBLICATIONS

"Service Discovery and Service Selection for the Broadcast TV Service" Digital Video Broadcasting, Tchnical Module—AHG on IPI, IPI2001-xx.

* cited by examiner

Primary Examiner — Annan Q Shang

(57) ABSTRACT

The invention relates to a set-top box receiver allowing access to interactive digital TV coming from any IP-network. It makes use of the SAP/SDP protocols as a logic link between "classic" DVB services (satellite, terrestrial, cable) and IP services. The invention allows providing TV services relying on existing Internet architecture. Simulation means are provided, in the MHP middleware, for building an Event Information Table upon the SDP messages. Specific preview information is added to the SDP messages so that they can be linked to a DVB service.

5 Claims, 1 Drawing Sheet

TRANSPARENT ACCESS OF STB MHP DIGITAL TV MIDDLEWARE TO IP VIDEO CONTENT

FIELD OF THE INVENTION

The invention relates to Digital Video Broadcasting (DVB) television. More particularly, it relates to a receiver for receiving digital interactive content provided on predefined service channels from at least a digital content provider, said content comprising event information data including data about programs, denoted events, which are provided by said content provider on said predefined service channels, the receiver comprising program guide means associated with display means for browsing said event information data and deriving a list of said service channels and their associated events to be displayed on said display means.

The invention also relates to an interactive digital video system comprising such a receiver.

BACKGROUND ART

The current DVB Digital television standard defines broadcast of audio, video and additional data on a stream. From this additional content, the interactive digital TV middleware MHP (Multimedia Home Platform) is able to extract several tables defined by the DVB SI (Section Information) standard relating to signaling information. Amongst these tables, the Event Information Table (EIT) contains data about the Events (the programs) broadcast on a specific Service (the channel). These data can then be browsed by means of specific software, called an Electronic Program Guide (EPG), which displays a list of Services (the channels) and their associated Events (the programs). However, the end-user is limited to browsing data coming from the stream only (that is a terrestrial, satellite or cable signal) and from no other source.

The DVB SI norm states that the EIT provides, amongst others, the name of the event, the start time of the event, the duration of the event, a locator, which is special information for the receiver (the Set Top Box or STB) to tune to the right Service.

Future developments of digital TV will probably provide several complementary sources linked to an Event: genuine DVB MPEG2 (Moving Picture Expert Group 2) streamed data (broadcast on a satellite, terrestrial or cable signal) and, for instance, an additional MPEG4 (Moving Picture Expert Group 4) preview stream coming from the Internet.

For such an application (MPEG4 preview stream coming from the Internet), the SDP/SAP protocols (Service Description Protocol/Service Announcement Protocol) seem to suit well, for they are designed to allow participation to multimedia conferences on the Internet. An end-user uses the SAP to register to an MPEG4 video announcer and is notified of the parameters of the video session thanks to the SDP. Therefore, the user needs several parameters, such as the name of the video, the start and end time of the video, the IP address of the MPEG4 video server and the number of the port on which the video is played.

Watching an SDP/SAP Internet-distributed MPEG4 preview of a broadcast MPEG2 Event would impose the merging of the SDP/SAP information (IP address and port) with the genuine DVB SI Event data, while complying with the DVB SI standard (and the EIT structure).

OBJECT AND SUMMARY OF THE INVENTION

It is an object of the invention to allow the user to use data provided by the DVB SI Event Information Table to access IP (Internet Protocol)-streamed video. An Event is proposed to the end-user, with which Event at least two sources are associated and the system has to provide a way to transparently access any of the sources.

In accordance with the invention, a receiver as mentioned in the opening paragraph is provided, wherein the receiver comprises service information means allowing use of said event information data to access IP (Internet Protocol)-streamed video content services, said service information means comprising the use of SAP/SDP (Service Announcement Protocol/Service Description Protocol) as a link between the service channels provided by said digital content provider and said IP-streamed services.

BRIEF DESCRIPTION OF THE DRAWINGS

The invention and additional features, which may be optionally used to implement the invention, are apparent from and will be elucidated with reference to the drawings described hereinafter and wherein.

DETAILED DESCRIPTION OF THE DRAWINGS

A problem solved by the invention is to allow a Set Top Box receiver to access interactive digital Television (TV) coming from any IP (Internet Protocol) network. It would allow small to medium-sized companies to provide TV services without requiring purchase of costly licenses and without the heavy infrastructure of a broadcaster, relying on existing Internet architecture. A solution lies in simulating in the MHP middleware an Event Information Table built upon the SDP messages.

To achieve such a result, specific "preview information" is added to the SDP messages, so that they can be linked to a DVB Service. It is proposed to add these fields to the structure of a SDP message:
 locator DvbLocator
 int eventID
Given that a SDP message provides the following useful data:
 start time of the Session
 end time of the Session
 IP address and port of the video server
 a session ID and revision ID which ensure the capability to generate a unique Event ID on the IP address and port (as DVB SI requires a unique Event ID on a Service).

A DVB Event is uniquely defined by the key (DvbLocator, EventID). Thanks to this information, the MHP middleware will be able to match a SDP message with a DVB Event, and then get the MPEG4 IP preview video linked to the MPEG2 broadcast Event.

A switching mechanism inside the MHP middleware is introduced to relay request for EIT to primary and secondary sources. Assuming that the system provides access to two sources:
 a primary source (with a regular Network Interface detected by the system), which Services are installed as specified by MHP;
 a secondary source, which provides only Events linked to the Events of the primary source.

Figure 1:
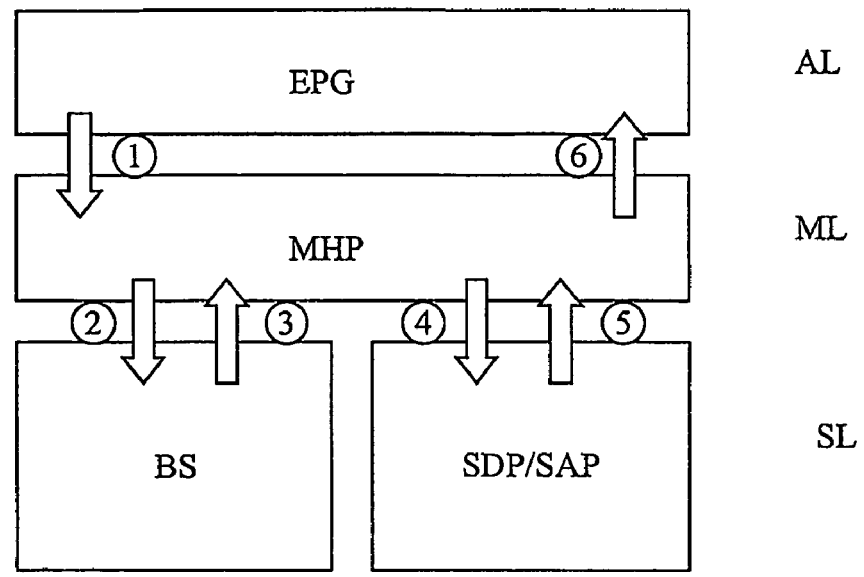
FIG. 1 is a functional block diagram for illustrating the functionalities of a receiver in accordance with the invention.

The system can be divided into three layers, as shown in FIG. 1. FIG. 1 shows a multiple-source MHP receiver comprising an Application Layer AL consisting of an electronic Program Guide EPG, a Middleware Layer, consisting of the Multimedia Home Platform MHP, a Primary source denoted BS consisting of Broadcast streams and a secondary source, denoted SDP/SAP, consisting of the IP-stream.

The proposed algorithm comprises the following 6 steps, indicated by reference numerals in FIG. 1:

1) The Application has a Service and its corresponding DvbLocator, defined by the Primary Source (it is installed at the startup of the system and located on the Network Interface of the Primary Source). The Application wants to retrieve an Event associated with this Service. It makes the request to the MHP middleware (step 1 in FIG. 1).
2) The MHP middleware requests for the Service to the Primary Source (step 2).
3) The Primary Source sends back the Event data to the middleware (step 3).
4) The MHP middleware extracts the unique Event ID from the Event and sends a request to the Secondary Source (SDP/SAP) for additional information concerning the Event uniquely identified by the key (DvbLocator, Event ID) (step 4).
5) The Secondary Source sends back its additional Event information to the middleware (step 5).
6) The MHP middleware merges the genuine data sent by the Primary Source with the additional information of the Secondary Source. It adds a specific private Descriptor to the content of the Event. This specific Descriptor is information that can be used to signal the presence of extended information in the Event. The middleware then sends back the result to the Application (step 6).

The Application receives the Event, and by scanning the list of Descriptors can determine if additional information is embedded in the Event, and extract it to play video from the Internet, for instance.

This invention allows transparent access to video applications, either from a "classic" source or from an IP network (LAN or Internet). A major application is the navigation amongst Events in a SDP/SAP source. In the explanation of the realization of the system, the SDP/SAP Source is enslaved to a Primary Source because its services are not installed (that is, they rely on other Services to be displayed and opened to the end-user customer). If SAP/SDP is used as a Primary Source, i.e. is recognized by the system as a fully independent Network Interface and its Services are installed, then the innovation can be extended to retrieve specific Events amongst the SDP/SAP Services.

The DVB SI norm defines three kinds of Events for a given Service:
the Present Event, which is the currently broadcast Event;
the Following Event, which is the next Event to come;
Scheduled Events, which are a set of Events (for instance, all the Events within the next 7 days).

The MHP middleware provides an API to retrieve information about these Present, Following and Scheduled Events. The Event data are sent continuously in a loop in the broadcast stream. The middleware can extract the right requested Events because each Event broadcast in the stream conveys additional information about its type (Present, Following, Scheduled).

The problem is to propose a similar behavior from a SDP/SAP source. SAP does not provide the same looping retransmission mechanism as a broadcast stream, and "pure" SDP messages do not have the notion of "Present", "Following" or "Scheduled". For the coming mechanism, we assume that a Service matches in a unique way a pair (IP address, port): all the programs of an IP-video channel come from the same server at the same port.

At the startup of the system, the middleware receives several SDP messages, each one describing an Event (that is, amongst other information, the start and end time of the Event, and the IP address and port of the server that plays the video). MHP can then build a Table of Services based upon the pairs of (IP address, port) conveyed in the Event information (that is the SDP messages). It is then able to present a list of Services to the end-user.

If the middleware has to retrieve information about the Present Event of a Service, it looks for the SDP message which has the following characteristics:
the pair (IP address, port) matches the pair of the Service as extracted from the Table of Services;
the start time of the Event is anterior to the current time of the system;
the end time of the Event is posterior to the current time of the system.

If the middleware has to retrieve information about the Following Event of a Service, it looks for the SDP message which has the following characteristics:
the pair (IP address, port) matches the pair of the Service as extracted from the Table of Services;
the start time of the Event is the nearest after the end time of the Present Event amongst all start times of the Events of the Service identified by the pair (IP address, port) (note that the start time of the Following Event may be equal to the end time of the Present Event).

If the middleware is requested for the Scheduled Events of a Service broadcast within a given time period (defined by a start time and an end time), it looks for the SDP messages which have the following characteristics:
the start time of the Events is posterior to the start time of the period and anterior to the end time of the period.

This invention allows a STB to access interactive digital TV coming from any IP-network. It would allow small to medium-sized companies to provide TV services without requiring purchase of costly licenses and without the heavy infrastructure of a broadcaster, relying on existing Internet architecture.

Figure 2:
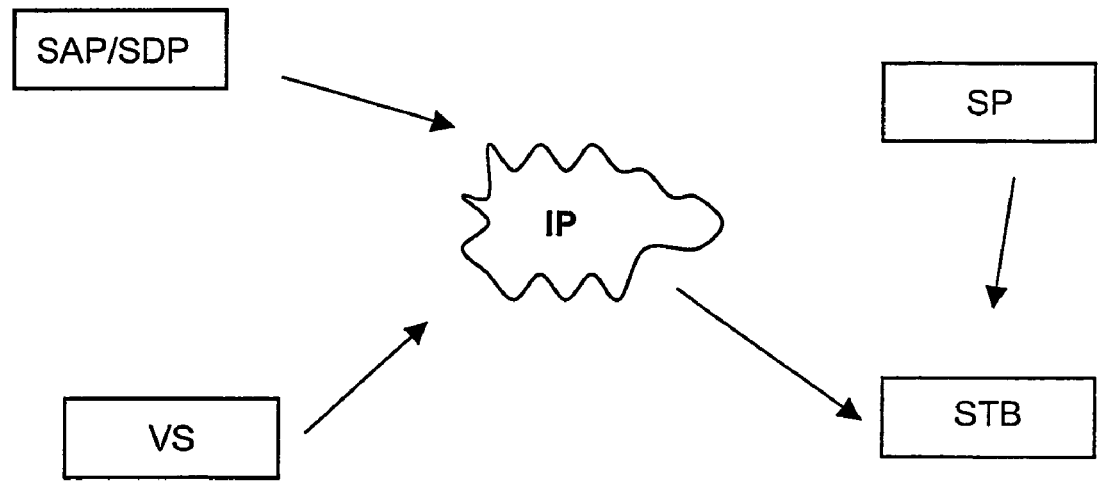
FIG. 2 is a functional block diagram illustrating an example of a system in accordance with the invention.

FIG. 2 shows the architecture of a system in accordance with the invention for allowing convergence of IP video and broadcast video on a Set Top Box receiver. The system comprises a receiver STB, for receiving video content, a broadcast video service provider SP, an Internet network IP, a video server VS and an Announces Server SAP/SDP.

The implementation of the middleware running on the STB is modified to extract its Event information not only from the broadcast MPEG2 stream but also from the SDP/SAP server. The latter sends back information about the videos that could be streamed by the MPEG4 video server. Specific EPG software, running on the STB, is able to extract those data from the EIT and pass them on to a MPEG4 video player software.

This invention allows transparent access to video applications, either from a "classic" source or from an IP network (LAN or internet).

The invention claimed is:

1. An end-user receiver for receiving digital interactive content provided on predefined service channels from at least a digital video content provider, said content comprising event information data including data about programs, denoted events, which are provided by said digital video content provider on said predefined service channels, the receiver comprising program guide means associated with display means for browsing said event information data and deriving a list of said service channels and their associated events to be displayed on said display means, wherein the end-user receiver further comprises service information means allowing use of said event information data to access IP (Internet Protocol)-streamed video content services via an Internet connection separate from said predefined service channels, said service information means comprising the use of SAP/SDP (Service Announcement Protocol/Service Description Protocol) as a link between the service channels provided by said digital video content provider and said IP-streamed services.

2. The end-user receiver as claimed in claim 1, wherein said service information means comprise simulation means for simulating said event information data built upon said SDP messages.

3. The end-user receiver as claimed in claim 2, wherein said simulation means include means for adding specific preview information to said SDP messages so that they can be linked to a service channel provided by said digital video content provider, denoted DVB service.

4. The end-user receiver as claimed in claim 3, wherein said specific preview information includes a key comprising a first field, denoted DVB Locator, for locating said DVB service and a second field, denoted Event ID for identifying the event associated with said DVB service, an event being uniquely defined by said key (DVB locator, Event ID).

5. An interactive digital video system comprising, at least, a digital video content provider for broadcasting DVB (Digital Video Broadcasting) content, an IP (Internet Protocol) network for providing IP-streamed video content and an end-user receiver having access to both broadcast and IP-streamed video content, wherein the end-user receiver is an end-user receiver as claimed in claim 1.

* * * * *